US010101735B2

United States Patent
Tiano

(10) Patent No.: US 10,101,735 B2
(45) Date of Patent: Oct. 16, 2018

(54) MODULAR SYSTEM FOR REAL-TIME EVALUATION AND MONITORING OF A MACHINING PRODUCTION-LINE OVERALL PERFORMANCES CALCULATED FROM EACH GIVEN WORKPIECE, TOOL AND MACHINE

(71) Applicant: Matitiahu Tiano, Herzliya (IL)

(72) Inventor: Matitiahu Tiano, Herzliya (IL)

( * ) Notice: Subject to any disclaimer, the term of this patent is extended or adjusted under 35 U.S.C. 154(b) by 767 days.

(21) Appl. No.: 14/412,590

(22) PCT Filed: Jul. 2, 2013

(86) PCT No.: PCT/IL2013/000058
§ 371 (c)(1),
(2) Date: Jan. 2, 2015

(87) PCT Pub. No.: WO2014/009942
PCT Pub. Date: Jan. 16, 2014

(65) Prior Publication Data
US 2015/0142154 A1  May 21, 2015

Related U.S. Application Data

(60) Provisional application No. 61/669,675, filed on Jul. 10, 2012.

(51) Int. Cl.
*G05B 19/418* (2006.01)
*G05B 19/4065* (2006.01)
(Continued)

(52) U.S. Cl.
CPC ... *G05B 19/41875* (2013.01); *G05B 19/4065* (2013.01); *G05B 2219/32179* (2013.01);
(Continued)

(58) Field of Classification Search
None
See application file for complete search history.

(56) References Cited

U.S. PATENT DOCUMENTS 5,815,400 A   9/1998 Hirai et al.
6,594,589 B1  7/2003 Coss
(Continued)

OTHER PUBLICATIONS

Israeli Patent Office, "International Search Report and Written Opinion in corresponding International Application No. PCT/IL2013/000058", dated Nov. 19, 2013, Israel.
(Continued)

*Primary Examiner* — Eric C Wai

(57) ABSTRACT

The present invention provides a modular system and method for real-time evaluation and monitoring of a machining production line overall performances, calculated from each given metal workpiece, consumable tool and machine. The present invention is configured for an iterative and incremental calculation and evaluation of the machining production-line overall performances, by incrementally evaluating individual workpiece's performances, consumable tools' performances and machine's performances, extracted from the data of a plurality of workpieces and machines. The present invention is further configured for comparing the workpiece's performances to a similar workpiece's best performance, extracted from the evaluation of a plurality of the data similar workpieces. The present invention is further configured for the identification of significant process faults and their cause. The present invention is further configured for the analysis of the applied engineering-plan effectiveness, using a defined engineering score.

22 Claims, 5 Drawing Sheets

(51) Int. Cl.
G06Q 10/06 (2012.01)
G06F 19/00 (2018.01)

(52) U.S. Cl.
CPC ... *G05B 2219/32366* (2013.01); *G06Q 10/06* (2013.01); *Y02P 90/10* (2015.11); *Y02P 90/16* (2015.11); *Y02P 90/20* (2015.11); *Y02P 90/22* (2015.11); *Y02P 90/26* (2015.11); *Y02P 90/82* (2015.11)

(56) References Cited

U.S. PATENT DOCUMENTS

| | | |
|---|---|---|
| 7,010,386 B2 | 3/2006 | McDonnell |
| 7,167,766 B2 | 1/2007 | Lam et al. |
| 2005/0234574 A1 | 10/2005 | Lam |
| 2011/0093365 A1 | 4/2011 | Tiano |
| 2011/0094279 A1 | 4/2011 | Suzuki et al. |

OTHER PUBLICATIONS

Israeli Patent Office, "International Search Report and Written Opinion in corresponding International Application No. PCT/IL2013/000058", Nov. 24, 2013, Israel.

Storage [180]

Workpiece's [110] data
- Physical characteristics (given)
- Material cost (given)
- Machining statistics (measured)
- Idle time and cause (measured, input)
- Resulted quality (input)
- Individual cost and gross profit (calculated)
- Comparable best performance: gross profit, machining procedure, energy efficiency (calculated)

Machining Tool's [120] data
- Physical characteristics (given)
- Manufacturer (input)
- Cost (input)
- Machining statistics (measured)
- Life cycle: per workpieces, per time (measured)
- Comparable best performance for machining process energy efficiency and gross profit,

Machine's [130] data
- Physical characteristics (given)
- Operational costs (given or calculated)
- Idle time and cause (measured, input)
- Fault time and cause (measured, input)

Organization's [210] data
- Production units hierarchy structure (given)
- Employees identifications and authorizations (given)
- Defined target standards (input)
- Forecast production plan (input)

FIG. 2

Display Device [195]

- Machining Tool's life cycle performances such as, time and Number of machined parts
- Workpiece's quality, machining statistics
- Machine's fault statistics, Idle time statistics, work center costs
- Applied engineering plan performances: time, quality.
- Cost evaluation: given cost + process dependent cost, compared with best performances
- Gross profit/Energy efficiency: evaluated per part, per period of time, per machine

FIG. 3

MODULAR SYSTEM FOR REAL-TIME EVALUATION AND MONITORING OF A MACHINING PRODUCTION-LINE OVERALL PERFORMANCES CALCULATED FROM EACH GIVEN WORKPIECE, TOOL AND MACHINE

BACKGROUND OF THE INVENTION

Present invention relates to an automatic modular system and method for real-time data collection, analysis and evaluation of different Key Performance Indicators (KPI) of an overall production-process concerning manufacturing processes such as but not limited to: metal machining, milling, drilling, sawing, grinding turning, forging etc.

Tiano US 2011/0093365, in a former application, disclosed a system and a process for measuring and collecting the performances data of consumables machining tools, to build a reliable, real-time database and to monitor the consumption and performance of a consumable tool through its life cycle.

The system, according to Tiano's former application comprises:
   a) an electrical storage cabinet configured to store consumable tools;
   b) first storage means to store data concerning the consumable tools;
   c) means to capture the performance data;
   d) second storage means to store performance data during operation of the consumable tool when is mounted on a machine;
   e) means to transfer in real-time the performance data to the second storage means;
   f) process means to assess the performance of the tool and on the basis of the assessment to instruct or not the withdrawal of the tool; output means to deliver the instruction to a user of the system and to the storage cabinet;
   g) means to allow the withdrawal of a new tool from the storage cabinet upon delivery of the instruction from the process means to withdraw the used tool.

The process, according to Tiano's former application, comprises the following steps:
   a) capture performance data during operation of the tool when the tool is mounted on a machine;
   b) transfer in real-time the performance data to the management system;
   c) assess the performance of the tool;
   d) on the basis of the assessment instruct or not the withdrawal of the used and new tool; and
   e) deliver the instruction to withdraw the used and the new tool to the user and to the storage cabinet via output means.

The system as in the present invention expands the scope of the performances measuring and evaluation to the overall production-process.

Prior art documents concerning the evaluation of the metal processing mainly relate to the actual fabrication (machining course of action) performances solely, e.g. trench etch steps, deposition steps, etc. required to produce a workpiece structure. Example for such document:

Lam, U.S. Pat. No. 7,167,766, discloses a material processing system including a process tool and a process performance control system. The process performance control system includes a process performance controller coupled to the process tool, where the process performance controller includes a process performance prediction model, a process recipe correction filter, a process controller, and process performance model correction algorithm. The process performance prediction model is configured to receive tool data from a plurality of sensors coupled to process tool and to predict process performance data. The process recipe correction filter is coupled to the process performance prediction model and configured to receive predicted process performance data and generate a process recipe correction for run-to-run process control. The process controller is coupled to the process recipe correction filter and is configured to update a process recipe according to the process recipe correction.

Other prior art documents concern with the development stage of the machining process based on static data inputs and predefined conditions, generating the initial NC program, which are later used in the production-process. Example for such a document:

Hirai, U.S. Pat. No. 5,815,400, discloses a machining method in which a numerically controlled apparatus carries out a series of operations such as the determination of machining procedures, the selection of a tool, the preparation of a workpiece [110] and inspection programs, machining operation, and inspection, required when a numerically controlled machine tool carries out a machining operation on the basis of input graphics and process information, using at least machine tool information, tool information, cutting condition information, material information, machining method symbol information, finishing symbol information, finishing allowance information, surface treatment information, information about thermal refining, and cost information, the method includes the steps of, while using electronic calculators including a numerical control unit, an FA system, and a personal computer, and a series of data processing units and machine tools, registering a variety of information files; inputting machining pattern data; processing a finished pattern; processing a machining pattern before a workpiece [110] has finished undergoing another process; identifying the pattern; making a decision with regard to a machining process; and deciding whether or not material should be measured.

In light of the above review, there is a long felt need in the metal-working industry and other production industries for a system that analyses input data that is collected during the production stage, based on real-time automatic inputs and evaluates the effectiveness of the overall machining process while it's running on the production machine. There is a further long felt need to monitor the overall production performances in order to generate recommendations for further production improvements.

SUMMARY OF THE INVENTION

It is one object of the present invention to provide a modular system [100] for real-time evaluation and monitoring of a machining production-line overall performances, calculated from the performances of at least one metal workpiece [110], at least one consumable tool [120] and at least one machine [130]; the system [100] comprising:
   a) identification device [140], configured for automated identification of at least one selected item from a group consisting of:
      the workpiece [110];
      the workpiece's [110] at least one consumable tool [120];

the workpiece's [110] machine [130];
the workpiece's [110] production operations number; and
any combination thereof;
b) recording device [150], configured to record at least one data input, concerning the machining production-line, selected from a group consisting of:
the workpiece's [110] machining course of action time-indicators, velocities and working parameters;
idle time, such as loading or unloading of the workpiece [110];
exceptional long waiting idle time;
the machine's [130] fault time;
the consumable tools' [120] wear time and wear amount; and
any combination thereof;
c) data-collection device [160], configured to collect at least one input data selected from a group consisting of:
data identified by the identification device [140];
data recorded by the recording device [150];
the workpiece's [110] machining course of action;
the workpiece's [110] loading idle time;
the shaped workpiece's [110] resulted quality;
the machine's [130] "fault" cause;
exceptional long waiting idle time cause;
the consumable tools' [120] wear characteristic features;
setup periods;
operator ID;
production batch number; and
any combination thereof;
d) Computerized Processing Unit (CPU) [170], configured to calculate and evaluate at least one performance selected from a group consisting of:
the workpiece's [110] performances;
the consumable tool's [120] performances;
the machine's [130] performances; and
any combination thereof;
e) storage device [180], configured to store at least one entry selected from a group consisting of:
all data which is not process-dependent [185];
all process-dependent data [186] including: the recorded data, the input data, data retrieved from the identification device [140] and all the calculated and evaluated information;
updated the workpiece's [110] performances;
updated the tool's [120] performances;
updated the machine's [130] performances; and
any combination thereof;
f) a user interface [190], configured for calculation and display selection; and
g) display device [195], configured to display the calculated and evaluated performances and further required information;
wherein the CPU [170] is configured for an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130];
the CPU [170] is further configured for comparing the workpiece's [110] performances to a similar workpiece's best performance, extracted from the evaluation of a plurality of the similar workpieces; the CPU [170] is further configured for the identification of significant process faults and the fault's cause;
the CPU [170] is further configured for the analysis of the effectiveness of the applied engineering-plan for the machining process, using a defined engineering score.

It is another object of the present invention to provide the modular system [100] as defined above, wherein the CPU [170] is further adapted to extract optimization recommendations, via the display device, for increasing the production capacity according to the evaluation of the best performances; such that the system [100] is configured to increase the process's energy efficiency and/or gross profit.

It is another object of the present invention to provide the modular system [100] as defined above, wherein the CPU [170] is further adapted to present optimization recommendations, via the display device, for reducing the production costs, according to the best performances; such that the system [100] is configured to increase the process's energy efficiency and/or gross profit.

It is another object of the present invention to provide the modular system [100] as defined above, wherein the CPU [170] is further adapted to identify a decline in the performances, classify the source of the decline and accordingly present maintenance recommendations, via the display device, such that the system [100] is configured for maintaining the process's energy efficiency and/or gross profit.

It is another object of the present invention to provide the modular system [100] as defined above, wherein the system [100] is further connected to the consumable tools [120] electrical storage cabinet for retrieving additional data regarding the consumable tools [120].

It is another object of the present invention to provide the modular system [100] as defined above, wherein the identification system [140] is configured for the identification of at least one feature selected from a group consisting of:
the workpiece's [110]: identification, material, description, dimensions, cost and application;
the consumable tools' [120]: identification, material, description, dimensions, cost, manufacturer and expected life cycle;
the machine's [130]: identification, operational cost, model and manufacturer; and
any combination thereof.

It is another object of the present invention to provide the modular system [100] as defined above, wherein the CPU [170] is configured for the calculation and evaluation of the workpiece's [110] performances, extracted from at least one feature selected from a group consisting of:
the unshaped workpiece's [110] cost;
the shaped workpiece's [110] selling price, according to its resulted quality;
the workpiece's [110] machining time;
the workpiece's [110] idle time;
the machine's [130] operational cost, for the machining time and idle time;
the consumable tools' [120] relative costs, each dived by the number of their machined workpieces [110] until wear-out;
the workpiece's [110] individual direct operations costs;
the workpiece's [110] individual gross profit;
the workpiece's [110] individual engineering score;
the workpiece's [110] cutting times;
the workpiece's [110] non cutting times;
the workpiece's [110] average spindle power;
the workpiece's [110] number of cuts;
the workpiece's [110] sub operations performances; and
any combination thereof.

It is another object of the present invention to provide the modular system [100] as defined above, wherein the sub operations performances include at least one performance indicator selected from a group consisting of:
- stock removal rate;
- specific stock removal energy;
- chip thickness ratio;
- cutting performance indicators, extracted from the velocities and working parameters of each cutting action of the workpiece [110]; and
- any combination thereof.

It is another object of the present invention to provide the modular system [100] as defined above, wherein the CPU [170] is configured for the calculation and evaluation of the consumable tool's [120] performances, extracted from at least one feature selected from a group consisting of:
- the consumable tool's [120] cost;
- the consumable tool's [120] wear-out characteristics such as: life-cycle, failure cause;
- the consumable tool's [120] number of machined workpieces [110] until wear-out; and
- any combination thereof.

It is another object of the present invention to provide the modular system [100] as defined above, wherein the CPU [170] is configured for the calculation and evaluation of the machine [130] performances, extracted from at least one feature selected from a group consisting of:
- the machine [130] operational cost;
- the machine [130] fault time;
- the machine [130] fault cause;
- the machine [130] working plan;
- the machine [130] exceptional long waiting idle time;
- the machine [130] exceptional long waiting idle time cause;
- the machine [130] setup time;
- the machine [130] neutral time;
- the machine [130] disconnection time; and
- any combination thereof.

It is another object of the present invention to provide the modular system [100] as defined above, wherein the CPU [170] collects a plurality of the individual workpiece's [110] performances and evaluates the machining production-line overall performances for at least one predetermined period of time selected from a group consisting of: hour, day, week, month, quarter, year, shift period, operator working period, machine [130] working period, operation period and any combination thereof.

It is another object of the present invention to provide the modular system [100] as defined above, wherein the CPU [170] is adapted to extract the best performances, by comparing the plurality of workpieces' [110] performances per the predetermined period of time, by using at least one function selected from a group consisting of: summarize, maximum, minimum, average, percentage and any combination thereof.

It is another object of the present invention to provide the modular system [100] as defined above, wherein the CPU [170] is further configured to evaluate at least one business plan selected from a group consisting of: choosing the consumable tool's [120] supplier, choosing the machine [130] manufacturer, evaluating the applied engineering plans, evaluating workers efficiency, evaluating machine's [130] efficiency, setting realistic goals to the different departments in the organization, implementing new innovative business models with suppliers based on cost per part or improvements sharing, and evaluating the effectiveness of the machining production line, where evaluations are based on the comparison to the best machining production-line overall performances and any combination thereof.

It is another object of the present invention to provide the modular system [100] as defined above, wherein the machine [130] is at least one machine selected from a group consisting of: metalworking machine, CNC machines, milling machines, turning machines, grinding machines, drilling machine, carving machine, EDM machines, laser machines, forging machines, water jet machines, deburring machines, chamfering machines, broaching machines and any combination thereof.

It is another object of the present invention to provide the modular system [100] as defined above, wherein the consumable tool [120] is at least one metalworking consumable cutting tool selected from a group consisting of: machining tools, milling tools, turning tools, grinding tools, drilling tools, carving tools, forging dies, deburring tools, chamfering tools, electrodes, broaching tools, dressing tools and any combination thereof.

It is another object of the present invention to provide the modular system [100] as defined above, wherein the identification device [140] can identify and add an unfamiliar new the item.

It is another object of the present invention to provide the modular system [100] as defined above, wherein the data collection device [160] can be notified of a planned the exceptional long waiting idle time;

It is another object of the present invention to provide the modular system [100] as defined above, wherein the recording device [150] is configured to record the machine's [130] "working" and "non-working" status and time-schedule, according to the machine's [330] a measured current consumption from the machine's [130] power supply.

It is another object of the present invention to provide the modular system [100] as defined above, wherein communication between: the identification device [140], the recording device [150], the data-collection device [160], the CPU [170], the storage device [180], the user interface [190] and the display device [195] is selected from a group consisting of: wired, wireless and any combination thereof.

It is another object of the present invention to provide the modular system [100] as defined above, wherein the user interface [190] is further configured for manual input data.

It is another object of the present invention to provide the modular system [100] as defined above, wherein the system [100] is configured to deliver the performances to the enterprise resource planning systems (ERP) or other external system.

It is another object of the present invention to provide a method for monitoring and evaluating a machining production-line overall performances, calculated from each given metal workpiece [110], consumable tool [120] and machine [130], comprising the steps:
a. automatically identifying the characteristic features of:
  - the workpiece [110];
  - the workpiece's [110] at least one consumable tool [120];
  - the workpiece's [110] machine [130];
b. recording data concerning the machining production line, selected from a group consisting of:
  - the workpiece's [110] machining course of action time indicators and velocities;
  - idle time, such as loading or unloading of the workpiece [110];
  - exceptional idle time;
  - the machine's [130] "fault" time;

the consumable tools' [120] wear time and tool's wear amount; and
any combination thereof;
c. collecting input-data concerning at least one selected from a group consisting of:
the workpiece's [110] machining course of action;
the shaped workpiece's [110] resulted quality;
the machine's [130] "fault" cause;
the exceptional idle time cause;
the consumable tools' [120] wear characteristic features;
the setup time;
the operator ID;
the production batch number; and
any combination thereof;
d. calculating and evaluating the performances of:
the workpiece's [110];
the consumable tools [120];
the machine [130];
e. storing:
all data which is not process-dependent;
all process-dependent data including: said recorded data, said input data, said identified characteristic features and all said calculated and evaluated information;
f. selecting the calculation and evaluation method;
g. updating the consumable tool's [120] performances and the machine's [130] performances;
h. selecting the displayed elements and combinations;
i. displaying the evaluated performances and further information; and
j. repeating the method for at least two workpieces [110];
wherein the step of calculating and evaluating comprises an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130]; the calculating and evaluating are further configured for comparing the workpiece's [110] performances to a similar workpiece's best performance, extracted from the evaluation of a plurality of the similar workpieces [110]; the calculating and evaluating are further configured for the identification of significant process faults and the faults' cause; the calculating and evaluating are further configured for the analysis of the effectiveness of the applied engineering-plan for the machining process, using a defined engineering score.

It is another object of the present invention to provide the method as defined above, wherein the step of calculating and evaluating further comprises extracting optimization recommendations, via the display device, for increasing the production capacity according to the evaluation of the best performances; thereby the method is configured for increasing the process's energy efficiency and/or gross profit.

It is another object of the present invention to provide the method as defined above, wherein the step of calculating and evaluating further comprises presenting optimization recommendations, via the display device, for reducing the production costs, according to the best performances; thereby the method is configured for increasing the process's energy efficiency and/or gross profit.

It is another object of the present invention to provide the method as defined above, wherein the step of calculating and evaluating further comprises identifying a decline in the performances, classifying the source of the decline and accordingly present maintenance recommendations, via the display device; thereby the method is configured for maintaining the process's energy efficiency and/or gross profit.

It is another object of the present invention to provide the method as defined above, wherein the method further comprises step of retrieving additional data regarding the consumable tools [120], from the consumable tools' [120] electrical storage cabinet.

It is another object of the present invention to provide the method as defined above, wherein the step of identifying is configured for the identification of features selected from a group consisting of:
the workpiece's [110]: identification, material, description, dimensions, cost and application;
the consumable tools' [120]: identification, material, description, dimensions, cost, manufacturer and expected life cycle;
the machine's [130]-identification, -operational cost, -model and -manufacturer; and;
any combination thereof.

It is another object of the present invention to provide the method as defined above, wherein the step of calculating and evaluating the workpiece's [110] performances, comprises extracting features selected from a group consisting of:
the unshaped workpiece's [110] cost;
the shaped workpiece's [110] selling price, according to its resulted quality;
the workpiece's [110] machining time;
the workpiece's [110] idle time;
the machine's [130] operational cost, for the machining time and idle time;
the consumable tools' [120] relative costs, each dived by the number of their machined workpieces [110] until wear-out;
the workpiece's [110] individual direct operations costs;
the workpiece's [110] individual gross profit;
the workpiece's [110] individual engineering score;
the workpiece's [110] cutting times;
the workpiece's [110] non cutting times;
the workpiece's [110] average spindle power;
the workpiece's [110] number of cuts;
the workpiece's [110] sub operations performances; and
any combination thereof.

It is another object of the present invention to provide the method as defined above, wherein the sub operations performances include performance indicators selected from a group consisting of:
stock removal rate;
specific stock removal energy;
chip thickness ratio;
cutting performance indicators, extracted from the velocities and working parameters of each cutting action of the workpiece [110]; and
any combination thereof.

It is another object of the present invention to provide the method as defined above, wherein the step of calculating and evaluating the consumable tool's [120] performances, comprises extracting features selected from a group consisting of:
the consumable tool's [120] cost;
the consumable tool's [120] wear-out characteristics such as: life-cycle, failure cause;
the consumable tool's [120] number of machined workpieces [110] until wear-out; and
any combination thereof.

It is another object of the present invention to provide the method as defined above, wherein the step of calculating and evaluating of the machine [130] performances, comprises extracting features selected from a group consisting of:
the machine [130] operational cost;
the machine [130] fault time;
the machine [130] fault cause;
the machine [130] working plan;
the machine [130] exceptional long waiting idle time;
the machine [130] exceptional long waiting idle time cause;
the machine [130] setup time;
the machine [130] neutral time;
the machine [130] disconnection time; and
any combination thereof.

It is another object of the present invention to provide the method as defined above, wherein the step of calculating and evaluating comprises collecting a plurality of the individual workpiece's [110] performances and evaluating the machining production-line performances for a predetermined period of time selected from a group consisting of: hour, day, week, month, quarter, year, shift period, operator working period, machine [130] working period, operation period and any combination thereof.

It is another object of the present invention to provide the method as defined above, wherein the step of calculating and evaluating comprises extracting the best performances, by comparing the plurality of workpieces' [110] performances the per period of time, by using a function selected from a group consisting of: summarize, maximum, minimum, average, percentage and any combination thereof.

It is another object of the present invention to provide the method as defined above, wherein the step of calculating and evaluating comprises evaluating business plans at least one selected from a group comprising of: choosing the consumable tool's [120] supplier, choosing the machine manufacturer, evaluating the applied engineering plans, evaluating workers efficiency, evaluating machine's [130] efficiency, setting realistic goals to the different departments in the organization, implementing new innovative models with suppliers based on cost per part or improvements sharing, and evaluating the effectiveness of the machining production line, where evaluations are based on the comparison to best machining production-line overall performances.

It is another object of the present invention to provide the method as defined above, wherein the machine [130] is selected from a group consisting of: metalworking machines, CNC machines, milling machine, turning machines, grinding machines, drilling machine, carving machine, EDM machines, laser machines, forging machines water jet machines, deburring machines, chamfering machines, broaching machines and any combination thereof.

It is another object of the present invention to provide the method as defined above, wherein the consumable tool [120] is a metalworking consumable cutting tool selected from a group consisting of: machining tools, milling tools, turning tools, grinding tools, drilling tools, carving tools, forging dies, deburring tools, chamfering tools, electrodes, broaching tools, dressing tools.

It is another object of the present invention to provide the method as defined above, wherein the identification device [140] can identify and add an unfamiliar new the item.

It is another object of the present invention to provide the method as defined above, wherein the data collection device [160] is configured to be notified of a planned the exceptional long waiting idle time;

It is another object of the present invention to provide the method as defined above, wherein the recording device [150] is configured to record the machine's [130] "working" and "non-working" status and time-schedule, according to the machine's [330] a measured current consumption from the machine's [130] power supply.

It is another object of the present invention to provide the method as defined above, wherein communication between: the identification device [140], the recording device [150], the data-collection device [160], the CPU [170], the storage device [180], the user interface [190] and the display device [195] is selected from a group consisting of: wired, wireless and any combination thereof.

It is another object of the present invention to provide the method as defined above, wherein the user interface [190] is further configured for manual input data.

It is another object of the present invention to provide the method as defined above, wherein the system [100] is configured for delivering the performances to the enterprise resource planning systems (ERP) or other external system.

It is another object of the present invention to provide a method for calculating, monitoring and evaluating a machining production-line overall performances, wherein the overall performances are calculated from a plurality of metal workpieces [110] which are processed in steps by a plurality of machines [130] incorporated in the production-line, from the consumable tools [120] which are mounted on the machines [130] and from the machines [130], whereby the calculation and the evaluation of the overall performance of the machining production-line is performed incrementally after each of the steps of production of the metal workpieces [110], and whereby the calculation of the evaluation of the overall performance of the machining production-line is performed iteratively and is updated after the completion of the machining of each one of the metal workpieces [110].

It is another object of the present invention to provide a modular system [200] for real-time evaluation and monitoring of a production-line overall performances, calculated from the performances of at least one part [210], at least one consumable material [220] and at least one machine [230]; the system [200] comprising:

a. an identification device [240], configured for automated identification of at least one item selected from a group consisting of:
the part [210];
the part's [210] consumable material [220];
the part's [210] machine [230];
the part's [210] production operations number; and
any combination thereof;

b. a recording device [250], configured to record at least one recorded data, concerning the production-line, selected from a group consisting of:
part's [210] processing course of action time-indicators, velocities and process parameters;
idle time, such as loading or unloading of the part [210];
exceptional long waiting idle time; and
machine's [230] fault time;
the consumable material [220] wear time and wear characteristics; and
any combination thereof;

c. a data-collection device [260], configured to collect at least one input data selected from a group consisting of:
data identified by the identification device [240];
data recorded by the recording device [250];
the part's [210] processing course of action;
the part's [210] loading idle time;

the produced part's [210] resulted quality;
the machine's [230] "fault" cause;
exceptional long waiting idle time cause;
the consumable material [220] wear characteristic features;
setup periods;
operator ID;
production batch number; and
any combination thereof;
d. a Computerized Processing Unit (CPU) [270], configured to calculate and evaluate at least one performance selected from a group consisting of:
the part's [210] performances;
the consumable material [220] performances;
the machine's [230] performances; and
any combination thereof;
based on the data collected by said data-collection device [260];
e. a storage device [280], configured to store at least one entry selected from a group consisting of:
all data which is not process-dependent [285];
all process-dependent data [286] including: the recorded data, the input data, data retrieved from the identification device [240] and all the calculated and evaluated performances;
updated the part's [210] performances;
updated the consumable material [220] performances;
updated the machine's [230] performances; and
any combination thereof;
f. a user interface [290], configured for calculation assortment and display selection; and
g. a display device [295], configured to display the calculated and evaluated performances and further required information;
wherein the CPU [270] is configured for an iterative and incremental calculation and evaluation of the production-line overall performances, by incrementally evaluating the individual parts [210] performances, the consumable material [220] performances and the machine's [230] performances, extracted from the recorded data and the input data of a plurality of the parts [210] and plurality of the machines [230];
the CPU [270] is further configured for comparing the part's [210] performances to a similar part's best performance, extracted from the evaluation of a plurality of the similar parts; the CPU [270] is further configured for the identification of significant process faults and the fault's cause;
the CPU [270] is further configured for the analysis of the effectiveness of the applied engineering-plan for the production process, using a defined engineering score.

It is another object of the present invention to provide the modular system [200] as defined above, wherein the system [200] is configured to be applied for industries producing discrete part's selected from a group consisting, but not limited, of: metalworking, rubber, plastic, electronics, semiconductors, textile, printing, paper, wood, tobacco, pharmaceutical, medical, food, beverage, construction, glass and stone.

It is another object of the present invention to provide the modular system [200] as defined above, wherein the recording device [250] is configured to further record the recorded data selected from a group consisting of:
a) the part's [210] processing course of action time-indicators, velocities and process parameters;
b) the machine's [230] fault time;
c) the consumable material [220] wear time and wear characteristics; and
d) any combination thereof.

It is still an object of the present invention to provide the modular system [200] as defined above, wherein the data-collection device [260] is configured to further collect the data input selected from a group consisting of:
a) the part's [210] processing course of action time-indicators, velocities and process parameters;
b) the machine's [230] fault time;
c) the consumable material [220] wear time and wear characteristics; and
d) any combination thereof.

It lastly an object of the present invention to provide the modular system [200] as defined above, wherein the consumable material [220] is selected from a group consisting of: injecting device and materials, punching device, forming device, spraying device and materials, sprinkling device and materials, cutting device and materials, molds, laser device, light device and optic device.

BRIEF DESCRIPTION OF THE DRAWINGS

In order to understand the invention and to see how it may be implemented in practice, a plurality of embodiments will now be described, by way of non-limiting example only, with reference to the accompanying drawings, in which

FIG. 2: presents a diagram describing the components of the storage means [180].

FIG. 3: presents a diagram describing the system's [100] output element displayed via the display means [195].

DETAILED DESCRIPTION OF PREFERRED EMBODIMENTS

Figure 1:
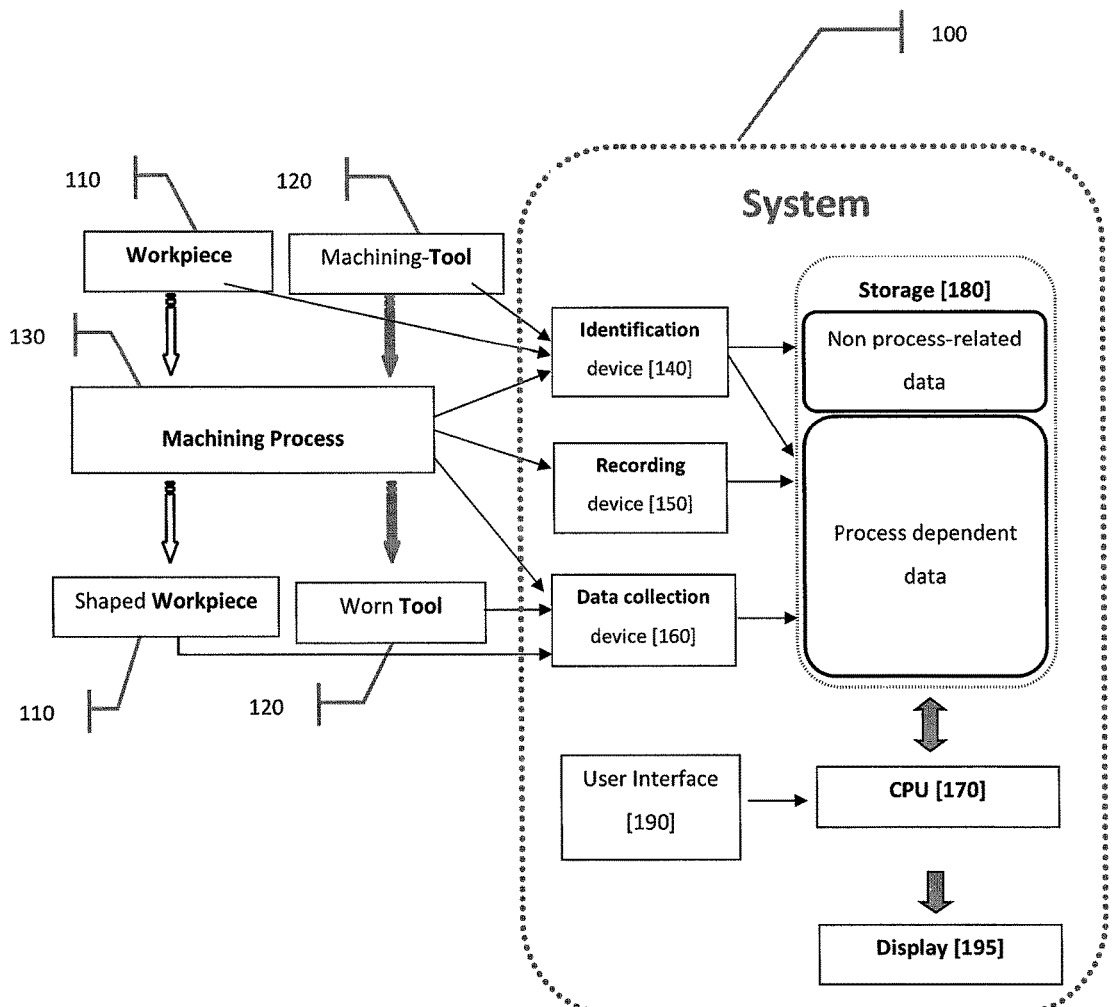
FIG. 1: presents an illustrated diagram describing the modular system [100] for real-time evaluation and monitoring of a machining production-line overall performances, its' components and its' relation with the machining process.

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a novel and useful modular system and methods for real-time evaluation and monitoring of a machining production-line overall performances, calculated from each given metal workpiece [110], consumable tool [120] and machine [130].

The machining production-line overall performances comprise measurements and data collected from a variety of domains involved in the manufacturing overall-process including: management, operations, engineering, maintenance, logistics, finance and quality-assurance.

The term energy efficiency refers hereinafter to the goal of reducing the amount of energy required to provide products or in this case the finished workpiece.

The present invention provides a modular system [100] for real-time evaluation and monitoring of a machining production-line overall performances, calculated from each given metal workpiece [110], consumable tool [120] and machine [130], comprising:
  a. identification device [140], for automated identification of:
    the workpiece [110];
    the workpiece's [110] at least one consumable tool [120];
    the workpiece's [110] machine [130];
    the workpiece's [100] production operations number;
  b. recording means [150] for data concerning the machining production-line selected from a group consisting of:
    the workpiece's [110] machining course of action time-indicators, velocities and working parameters;
    idle time, such as loading or unloading of the workpiece [110];
    exceptional long waiting idle time;
    the machine's [130] "fault" time;
    the consumable tools' [120] wear time and tools' wear amount; and
    any combination thereof;
  c. data-collection [160] device for collecting input data selected from a group consisting of:
    the workpiece's [110] machining course of action;
    the workpiece's [100] loading idle time;
    the shaped workpiece's [110] resulted quality;
    the machine's [130] "fault" cause;
    exceptional long waiting idle time cause;
    the consumable tools' [120] wear characteristic features;
    setup periods;
    operator ID;
    production batch number; and
    any combination thereof;
  d. Computerized Processing Unit (CPU) [170], configured for calculating and evaluating the performances, selected from a group consisting of:
    the workpiece's [110];
    the consumable tools [120];
    the machine [130]; and
    any combination thereof;
  e. storage means [180] for:
    all data which is not process-dependent [185];
    all process-dependent data [186] including: the recorded data, the input data, data retrieved from the identification device [140] and all the calculated and evaluated information;
    updated the workpiece's [110] performances;
    updated the consumable tool's [120] performances;
    updated the machine's [130] performances;
  f. user interface [190] for calculation and display selection; and
  g. display means [195], for displaying the calculated and evaluated performances and further information.
wherein the CPU [170] is configured for an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130]; the CPU [170] is further configured for comparing the workpiece's [110] performances to a similar workpiece's best performance, extracted from the evaluation of a plurality of the similar workpieces; the CPU [170] is further configured for the identification of significant process faults and the faults' cause; the CPU [170] is further configured for the analysis of the effectiveness of the applied engineering-plan for the machining process, using a defined engineering score; thereby the system [110] is further configured for monitoring and evaluating the process's energy efficiency and/or gross profit.

The present invention's CPU [170] is further adapted to extract optimization recommendations, via the display means, for increasing the production capacity according to the evaluation of the best performances; thereby the system is configured for increasing the process's energy efficiency and/or gross profit.

The present invention's CPU [170] is further adapted to present optimization recommendations, via the display means, for reducing the production costs, according to the best performances; thereby the system is configured for increasing the process's energy efficiency and/or gross profit.

The present invention's CPU [170] is further adapted to identify a decline in the performances, classify the source of the decline and accordingly present maintenance recommendations, via the display means; thereby the system is configured for maintaining the process's energy efficiency and/or gross profit.

The present invention's CPU [170] is configured for the calculation and evaluation of the workpiece's [110] performances, extracted from features selected from a group consisting of:
  the unshaped workpiece's [110] cost;
  the shaped workpiece's [110] selling price, according to its resulted quality;
  the workpiece's [110] machining time;
  the workpiece's [110] idle time;
  the machine's [130] operational cost, for the machining time and idle time;
  the consumable tools' [120] relative costs, each dived by the number of their machined workpieces [110] until wear-out;
  the workpiece's [110] individual direct operations costs;
  the workpiece's [110] individual gross profit;
  the workpiece's [110] individual engineering score;
  the workpiece's [110] cutting times;
  the workpiece's [110] non cutting times;
  the workpiece's [110] average spindle power;
  the workpiece's [110] number of cuts;
  the workpiece's [110] sub operations performances include performance indicators such as but not limited to:
    stock removal rate, known as Qw,
    specific Stock Removal Energy, known as EC,
    chip Thickness Ratio known as CTR,
    any other cutting performance indicator extracted from the velocities and working parameters of each cutting action of the workpiece [110]; and
  any combination thereof.

The present invention further provides a method for monitoring and evaluating the machining production-line overall performances, calculated from each given metal workpiece [110], consumable tool [120] and machine [130], comprising the steps:
  a. automatically identifying the characteristic features of:
    the workpiece [110];
    the workpiece's [110] at least one consumable tool [120];
    the workpiece's [110] machining machine [130];

b. recording data concerning said machining production line, such as:
   said workpiece's [110] machining course of action time indicators and velocities;
   idle time, such as loading or unloading of said workpiece [110];
   exceptional idle time;
   the machine's [130] "fault" time;
   the consumable tools' [120] wear time and tool's wear amount;
c. collecting input-data concerning:
   the workpiece's [110] machining course of action;
   the shaped workpiece's [110] resulted quality;
   the machine's [130] "fault" cause;
   the exceptional idle time cause;
   the consumable tools' [120] wear characteristic features;
   the setup time;
   the operator ID;
   the production batch number;
d. calculating and evaluating the performances of:
   the workpiece's [110] machining course of action;
   the consumable tools [120];
   the machine [130];
e. storing:
   all data which is not process-dependent;
   all process-dependent data including: the recorded data, the input data, the identified characteristic features and all the calculated and evaluated information;
f. selecting the calculation and evaluation method;
g. updating the consumable tool's [120] performances and the machine's [130] performances;
h. selecting the displayed elements and combinations;
i. displaying the evaluated performances and further information;
j. repeating the method for at least two workpieces [110];
wherein the calculating and evaluating are configured for an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130]; the calculating and evaluating are further configured for comparing the workpiece's [110] performances to a similar workpiece's best performance, extracted from the evaluation of a plurality of the similar workpieces [110]; the calculating and evaluating are further configured for the identification of significant process faults and the faults' cause; the calculating and evaluating are further configured for the analysis of the effectiveness of the applied engineering-plan for the machining process, using a defined engineering score; thereby the method is further configured for monitoring and evaluating the process's energy efficiency and/or gross profit.

The present invention further provides a method for calculating, monitoring and evaluating a machining production-line overall performances, wherein the overall performances are calculated from a plurality of metal workpieces [110] which are processed in steps by a plurality of machines [130] incorporated in the production line, from the consumable tools [120] which are mounted on the machines [130] and from the machines [130], whereby the calculation and the evaluation of the overall performance of the machining production-line is performed incrementally after each of the steps of production of the metal workpieces [110], and whereby the calculation of the evaluation of the overall performance of the machining production-line is performed iteratively and is updated after the completion of the machining of each one of the metal workpieces [110].

The present invention is an automatic system [100] and method for data collection and evaluation algorithms that present different Key Performance Indicators (KPI). The performances indicators are further monitored and controlled for improvement of the production process and thereby for increasing the energy efficiency and/or gross profit:

1. A fully automatic Gross profit as the main KPI, which summarize the whole performances effectiveness in one figure.
2. A fully automatic Overall Equipment Efficiency (OEE) which summarize the operational performance effectiveness in one figure.
3. A fully automatic direct operations costs which summarize the engineering performance effectiveness in one FIG.
4. The innovative Engineering Score ratio which gives an indication to the engineering process effectiveness for a given workpiece [110], according to the following formula.

$$EngScore = \frac{\left(TableSpeed\left[\frac{mm}{min}\right] \times CuttingDepth[mm]\right)}{ToolWear[mm]}$$

Material removal rate per tool [120] wear; the higher the score the better the process The system further presents past, present and future dynamic reference lines, based on best practiced performance, which define attainable goals for the Key Performance Indicators (KPI) of each and every function in the organization including: management, operations, engineering, maintenance, logistics and quality assurance.

The system evaluates the process's performance effectiveness and marks them as "good" or "bad" (e.g. Red/Green light signing). This indicator is further used for Root Cause Analysis tracking.

The system uses data aggregation from the lowest production unit, i.e. machine [130], up to the top production unit i.e. corporate.

The system has dynamic real-time consumables stock level indicators, addressing the changes in the production program and the changes in the production performances.

The system further supports indicators for Risk and Revenue Sharing partnership business models, including self-effectiveness evaluation, i.e. periodic Return On Investment (ROI).

The innovative system operates in five courses: collection of the data, calculation of the data, measurement of the data required for the performances evaluation, suggesting an optimization for the measured performances while simultaneously sustaining present performances, i.e. alerting a decline in current performances.

Data Collection

The system collects the data automatically from the production machines [130] by identifying parameters that are automatically implant, at predefined locations, in the CNC (Computer Numeric Control) program. When encounter such an implant parameter, whilst the CNC program is running and activating the machine [130], the system will automatically transmit a trigger, accompanied with a list of relevant parameters pulled automatically from the CNC program, with the time stamp of the event.

Furthermore, the system is capable of collecting the data by any other, already known, means that are incorporated in the machine's software.

Calculation

The system registers all the collected data into an event-log and performs a series of calculations.

Measurement

Based on the calculated data the system [100] measures the production performances and presents the different KPI's relevant to the different functions in the organization.

Optimization and Performances Maintenance

The system [100] supports the optimization of the different production departments by identifying areas for improvement and set realistic optimization goals for each KPI. The system presents the relation between one KPI to the other enabling the user to perform an intuitive root cause analysis and identify the root element that may be improved. The system compares the actual KPI to the already achieved best practice KPI, the system will then set a realistic goal for the optimization of each KPI and will mark and highlight the KPIs which should be improved. Optimizing the highlighted KPIs will eventually bring management improvements.

The proposed system allows each department in the production process to continuously follow and monitor their performances, in order to identify a decline in their performances level and immediately address and correct the performances.

The system automatically defines practical best practice performances targets standards for each of the measurements for a further comparison, update and an optional identification of performances decline.

Based on the best performances set as target standards and based on the definition of the required efficiency, the system calculates the practical best performances values that could be reached or that should be reached.

The system compares the actual measured performances to the practical best performances and indicates an improvement or a decline (e.g. alerts with Green or Red light).

When the system identifies a significant decline in the measured performances compared with expected best performances, the system will track and classify the source for the decline via a root cause analysis procedure. The system will evaluate the production performances per different periods of time, and will sort the performances by the different KPIs including the gross profit as the main KPI.

The present invention further discloses a method for an automatic measurement and evaluation of the energy efficiency and/or gross profit of a workpiece [110] produced in a metalworking (machining) process.

The metalworking process comprises a production machine [130] and a set of consumable machining tools [120] mounted on the production machine [130], whereby the metalworking (machining) process machines a plurality of workpieces [110], the method including the following steps:
1. storing characteristic values describing the tools [120] and the expected performance of the tools [120];
2. storing characteristics values describing the costs to operate the production machine [130];
3. storing characteristics values describing each type of the plurality workpieces [110];
4. upon starting the machining of each one of the plurality of workpieces [110], the production machine [130] sends a first signal accompanied with a list of information relevant to the first signal (alternatively: upon starting the machining of each one of the plurality of workpieces [110], the receiving a first signal);
5. upon completing the machining of each one of the plurality of workpieces [110], the production machine [130] sends a second signal accompanied with a list of information relevant to the second signal (alternatively: upon starting the machining of each one of the plurality of workpieces [110], the receiving a second signal);
6. storing characteristics of each one of the plurality of workpieces [110] that has been produced;
7. storing when a tool [120] is mounted on the production machine [130];
8. determining the number of the workpieces [110] that have been machined with the tool [120];
9. assessing the performance of the tool [120] on the basis of:
    a. the characteristic values describing the expected performance of the tool [120],
    b. the characteristics of each one of the plurality of workpieces [110] that has been produced,
    c. the number of the workpieces [110] that have been machined with the tool [120].

Further according to the above mentioned method, the characteristics of each one of the plurality of workpieces [110] that has been produced, includes: the type of the tools [120], the production time and the idle time.

Further according to the above mentioned method, when a used tool [120] is withdrawn from the production machine [130], the performances of the consumable-tool [120] over its' life cycle is assessed on the basis of the characteristics of each one of the plurality of workpieces [110] that has been produced with the consumable-tool [120] and the number of the workpieces [110] that have been machined with the tool [120].

The present invention further discloses a system to an automatic measurement of the energy efficiency and/or gross profit of a workpiece [110] produced in a metalworking process, whereby the metalworking process machines a plurality of workpieces [110] comprising:
1. first storing means to store characteristic values describing the consumable-tools [120] and the expected performance of the tool [120];
2. second storing means to store characteristic value describing the costs to operate the production machine [130];
3. third storing means to store characteristics values describing each type of the plurality workpieces [110];
4. receiving means to receive a first signal accompanied with relevant information when the production machine [130] starts to produce each one of the plurality of workpieces [110] and a second signal accompanied with relevant information when the production machine [130] finishes the production of each one of the plurality of workpieces [110];
5. fourth storing means to store the characteristics of each one of the plurality of workpieces [110] that has been produced;
6. fifth storing means to store when a tool [120] is mounted on the production machine [130];
7. first process means to determine the number of the workpieces [110] that have been worked with the tool [120]; and
8. second process means to assess the performance of the tool [120] on the basis of:
    a. the characteristic values describing the expected performance of the tool [120], b. the characteristics of each one of the plurality of workpieces [110] that has been produced and
c. the number of the workpieces [110] that have been worked with the tool [120];
9. third process means to assess the energy efficiency and/or gross profit of each one of the plurality of workpieces [110] produced on the basis of the measured characteristics of each one of the plurality of workpieces [110] that has been produced.

In another embodiment the machine [130] costs are calculate according to several configurations:
1. The cost of activating the machine [130] per hour, which includes the price of purchasing and the price of the maintenance of the machine divided by the machine life-cycle in working hours or working period.
2. The cost of the working an employee hour, which includes the employee's salary per hour, divided by the number of machines under his/her responsibility under a certain work-shift.
3. The cost of the whole factory processing floor, according to the structure's rental costs dived by the area required for a specific machine.
4. The costs of the electric power consumption are measured and calculated per the consumption of a certain machine or the whole proceeding line, according the costs of the power supply with or without the costs of the power supply maintenance.
5. Any other fixed costs, which are related to a certain machine or related to the whole production line.

Reference is now made to FIG. 1, which presents a diagram describing the modular system [100], its' components and its' relation with the machining process. The modular real-time evaluation and monitoring-system [100] comprises:
an identification device [140], for an automated identification of:
  the metal workpiece [110];
  the workpiece's [110] at least one consumable tool [120];
  the workpiece's [110] machine [130];
  the workpiece's [110] production operations number;
a recording means [150] for recording data concerning the machining-production-line such as:
  the workpiece's [110] machining course of action time-indicators, velocities and working parameters;
  idle time, such as loading or unloading of the workpiece [110];
  exceptional idle time, such as but not limited to, loading new tools [120];
  the machine's [130] "fault" time;
  the consumable tools' [120] wear time and tools' wear amount;
a data-collection [160] device for collecting input data concerning:
  the workpiece's [110] machining course of action;
  the workpiece's [110] loading idle time;
  the shaped workpiece's [110] resulted quality;
  the machine's [130] "fault" cause;
  the exceptional long waiting idle-time cause;
  the consumable tools' [120] wear characteristic features;
  the setup times;
  the operator ID;
  the production batch;
a Computerized Processing Unit (CPU) [170], configured for calculating and evaluating the performances, selected from a group consisting of:
  the workpiece's [110] machining course of action;
  the consumable tools [120];
  the machine [130];
  the applied engineering plan of the machining process; and
  any combination thereof;
a storage means [180] for:
  all data which is not process-dependent;
  all process-dependent data including: the recorded data, the input data, data retrieved from the identification system and all the calculated and evaluated information;
  updated the workpiece's [110] performances;
  updated the consumable tool's [120] performances;
  updated the machine's [130] performances;
a user interface [190] for selecting calculation and the evaluation method and for selecting display elements and combinations;
and display means [195], for displaying the calculated and evaluated performances and further information.

The above described CPU [170] is configured for an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130]; the CPU [170] is further configured for comparing the workpiece's [110] performances to a similar workpiece's best performance, extracted from the evaluation of a plurality of the similar workpieces; the CPU [170] is further configured for the identification of significant process faults and the faults' cause; the CPU [170] is further configured for the analysis of the effectiveness of the applied engineering-plan for the machining process, using a defined engineering score; thereby the system [110] is further configured for monitoring and evaluating the process's energy efficiency and/or gross profit.

Reference is now made to FIG. 2, which presents a diagram describing the components of the storage means [180] including:
  Workpiece's [110] data including: physical characteristics, which is a given data; Material cost, which is a given data; Machining statistics, which is a measured data; Idle time which is a measured data; Resulted quality which is an input data; Individual engineering score, direct operations costs, energy efficiency and/or gross profit, which are calculated data; and comparable best performance: engineering score, direct operations costs energy efficiency and/or gross profit, machining procedure which are calculated;
  Machining consumable tool's [120] data including: physical characteristics which is a given data; Manufacturer which is a given data; cost which is an input data; Machining statistics which is a measured data; Life cycle: per workpieces [110], per time which is a measured data; and Comparable best performance for energy efficiency and/or gross profit which is calculated data.
  Machining production machine's [130] data including: physical characteristics which is a given data; Operational costs which is a given data; Exceptional long waiting Idle time which is a measured data and it's cause which is an input data; Fault time which is a measured data and it's cause which is an input data.
  Organization data [210] including: production units hierarchy structure, which is a given data; employees identifications and authorizations, which are given data; manual defined target standards, which are input data; forecast production plan, which is input data.

FIG. 3 as shown presents a diagram describing the system's [100] output element displayed via the display means [195] including: Workpiece's [110] quality, machining statistics; machine's [130] fault statistics; idle time statistics; applied engineering plan performances; machining consumable tool's [120] life cycle performances such as, time and Number of machined parts; Cost evaluation: given cost+process dependent cost, compared with best performances; Efficiency evaluation: reflecting the different time unit elements influence on the quantity of workpiece's [110] produced; energy efficiency and/or gross profit: evaluated per workpiece [110], per period of time, per machine [130].

Figure 4:
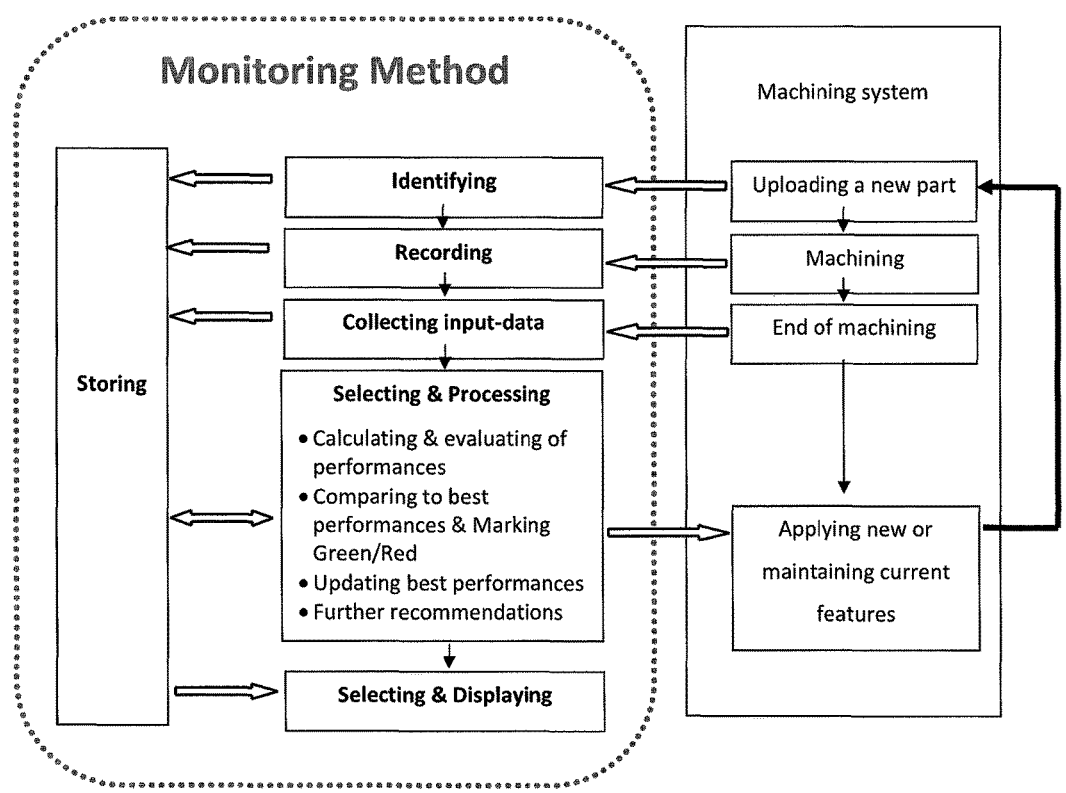
FIG. 4: presents an illustrated diagram describing the monitoring method, its' steps and its' relation with the machining process.

FIG. 4 as shown presents an illustrated diagram describing the monitoring method, its' steps and its' relation with the machining process including the steps of:

Automatically identifying the characteristic features of: the workpiece [110]; the workpiece's [110] at least one consumable tool [120]; the workpiece's [110] machine [130]; and the workpiece's [110] production operations numbers;

Recording data concerning the machining production line, such as: the workpiece's [110] machining course of action time indicators, velocities and working parameters; idle time, such as loading or unloading of the workpiece [110]; exceptional long waiting idle time such as loading of the new tool [120]; the machine's [130] "fault" time; the tools' [120] wear time and tools' wear amount;

Collecting input-data concerning: the workpiece's [110] machining course of action; the workpiece's [110] loading idle time; the shaped workpiece's [110] resulted quality; the machine's [130] "fault" cause; the exceptional long waiting idle time cause; the tools' [120] wear characteristic features;

Calculating and evaluating the performances of: the workpiece's [110] machining course of action; the consumable-tools [120]; the machining machine [130]; application engineering plan of the machining process;

Storing: all data which is not process-dependent; all process-dependent data including: the recorded data, the input data, the identified characteristic features and all the calculated and evaluated information;

Selecting the calculation and evaluation method;

Updating the workpiece's [110] performances, the consumable tool's [120] performances and the machine's [130] performances;

Selecting the displayed elements and combinations;

Displaying the calculated and evaluated performances and further information; and Repeating the method for at least two the workpieces [110].

The above mentioned steps of calculating and evaluating are configured for an iterative and incremental calculation and evaluation of the machining production-line overall performances, by incrementally evaluating the individual workpiece's [110] performances, the consumable tools' [120] performances and the machine's [130] performances, extracted from the recorded data and the input data of a plurality of the workpieces [110] and plurality of the machines [130]; the calculating and evaluating are further configured for comparing the workpiece's [110] performances to a similar workpiece's best performance, extracted from the evaluation of a plurality of the similar workpieces [110]; the calculating and evaluating are further configured for the identification of significant process faults and the faults' cause; the calculating and evaluating are further configured for the analysis of the effectiveness of the applied engineering-plan for the machining process, using a defined engineering score; thereby the method is further configured for monitoring and evaluating the process's energy efficiency and/or gross profit.

Figure 5:
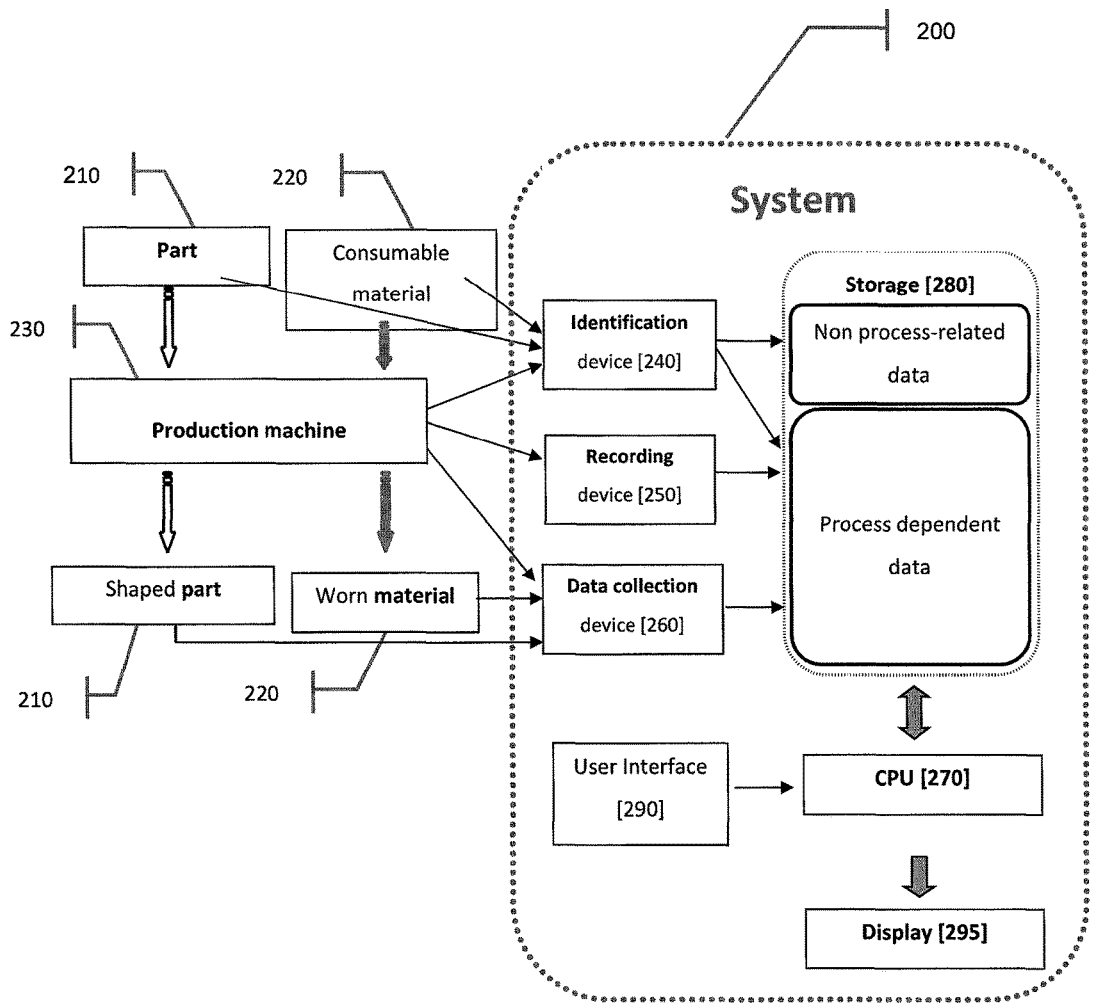
FIG. 5: presents an illustrated diagram describing the modular system [200] for real-time evaluation and monitoring of a production-line overall performances, its' components and its' relation with the production process.

Reference is now made to FIG. 5 which describes the modular system [200] for real-time evaluation and monitoring of a production-line overall performances, calculated from the performances of at least one part [210], at least one consumable material [220] and at least one machine [230]; the system [200] comprising:

a. an identification device [240], configured for automated identification of at least one item selected from a group consisting of:
  the part [210];
  the part's [210] consumable material [220];
  the part's [210] machine [230];
  the part's [210] production operations number; and
  any combination thereof;

b. a recording device [250], configured to record at least one recorded data, concerning the production-line, selected from a group consisting of:
  idle time, such as loading or unloading of the part [210];
  exceptional long waiting idle time; and
  any combination thereof;

c. a data-collection device [260], configured to collect at least one input data selected from a group consisting of:
  data identified by the identification device [240];
  data recorded by the recording device [250];
  the part's [210] processing course of action;
  the part's [210] loading idle time;
  the produced part's [210] resulted quality;
  the machine's [230] "fault" cause;
  exceptional long waiting idle time cause;
  the consumable material [220] wear characteristic features;
  setup periods;
  operator ID;
  production batch number; and
  any combination thereof;

d. a Computerized Processing Unit (CPU) [270], configured to calculate and evaluate at least one performance selected from a group consisting of:
  the part's [210] performances;
  the consumable material [220] performances;
  the machine's [230] performances; and
  any combination thereof;
  based on the data collected by the data-collection device [260];

e. a storage device [280], configured to store at least one entry selected from a group consisting of:
  all data which is not process-dependent [285];
  all process-dependent data [286] including: the recorded data, the input data, data retrieved from the identification device [240] and all the calculated and evaluated performances;
  updated the part's [210] performances;
  updated the consumable material [220] performances;
  updated the machine's [230] performances; and
  any combination thereof;

f. a user interface [290], configured for calculation assortment and display selection; and g. a display device [295], configured to display the calculated and evaluated performances and further required information;

The CPU [270] is configured for an iterative and incremental calculation and evaluation of the production-line overall performances, by incrementally evaluating the individual parts [210] performances, the consumable material [220] performances and the machine's [230] performances, extracted from the recorded data and the input data of a plurality of the parts [210] and plurality of the machines [230].

The CPU [270] is further configured for comparing the part's [210] performances to a similar part's best performance, extracted from the evaluation of a plurality of the similar parts.

The CPU [270] is further configured for the identification of significant process faults and the fault's cause.

The CPU [270] is further configured for the analysis of the effectiveness of the applied engineering-plan for the production process, using a defined engineering score.

Therefore the system [200] is further configured for monitoring and evaluating the process's energy efficiency and/or gross profit.

In another embodiment the present invention can be a service of other processing industries such as but not limited to: rubber, plastic, electronics, semiconductors, textile, printing, paper, wood, tobacco, pharmaceutical, medical, food, beverage, construction, glass and natural stone.

According to another embodiment, the system's [200] consumable material [220] can be selected from a group consisting of but not limited to: injecting device and materials, punching device, forming device, spraying device and materials, sprinkling device and materials, cutting device and materials, molds, laser device, light device and optic device It will be appreciated by a person skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

The invention claimed is:

1. A modular industrial-control based system [100] for real-time evaluation and monitoring of overall performances of a machining production-line, calculated from performances of at least one machined metal workpiece [110], at least one consumable tool [120] and at least one machine [130]; said system [100] comprising:
   a. identification devices [140] of said machines, configured for performing one or more automated identifications and transmissions of first signals denoting said identifications of at least one selected item from a group consisting of:
   said workpieces [110];
   said workpieces' [110] at least one consumable tool [120];
   said workpieces' [110] machine [130];
   said workpieces' [110] production operations number; and
   any combination thereof;
   b. recording devices [150] of said machines, configured to record at least one data input and transmit second signals denoting said data inputs, concerning said machining production-line, selected from a group consisting of:
   machining course of action time-indicators, velocities and working parameters of said workpieces [110];
   idle time, such as loading or unloading of said workpieces [110];
   exceptionally long waiting idle time;
   said machine's [130] fault time;
   said consumable tools' [120] wear time and wear amount; and
   any combination thereof;
   c. a data-collection device [160], configured to collect at least one input data selected from a group consisting of:
   said identifications by said identification device [140];
   said data input recorded by said recording device [150];
   said workpieces' [110] machining course of action;
   said workpieces' [110] loading idle time;
   said shaped workpieces' [110] resulted quality;
   said machines' [130] fault cause;
   exceptionally long waiting idle time cause;
   said consumable tools' [120] wear characteristic features;
   setup periods;
   operator ID;
   production batch number; and
   any combination thereof;
   d. a Computerized Processing Unit (CPU) [170], configured to receive said input data from said data-collection device [160] and calculate and evaluate, as a function of said input data, at least one performance selected from a group consisting of:
   performances of said workpieces [110];
   performances of said consumable tools [120];
   performances of said machines [130]; and
   any combination thereof;
   e. a storage device [180], configured to receive from said CPU [170] and store at least one data entry selected from a group consisting of:
   all data which is not process-dependent [185];
   all process-dependent data [186] including: said input data and all said calculated and evaluated information;
   updated said workpieces' [110] performances;
   updated said tools' [120] performances;
   updated said machines' [130] performances; and
   any combination thereof;
   f. a user interface [190], configured for selecting a method of said calculation and selecting elements and combinations to display said calculated and evaluated performances; and
   g. a display device [195], configured to display said calculated and evaluated performances;
   wherein said CPU [170] is further configured for an iterative and incremental calculation and evaluation of said machining production-line overall performances, by incrementally evaluating said individual workpieces' [110] performances, said consumable tools' [120] performances and said machines' [130] performances, extracted from said input data of a plurality of said workpieces [110] and plurality of said machines [130]; said system [100] is further configured to display said overall performances on said display device;
   said machining production-line overall performances comprise one or more key performance indicators (KPIs); said KPIs selected from a group consisting of
   i. a gross profit;
   ii. an overall equipment efficiency (OEE);

iii. direct operations costs; and
iv. an engineering score defined by $$EngScore = \frac{(TableSpeed\left[\frac{mm}{min}\right] \times CuttingDepth\,[mm])}{ToolWear\,[mm]};$$"

said CPU [170] is further configured for comparing said workpieces' [110] performances to a similar workpieces' [110] best performance, extracted from said evaluation of a plurality of said similar workpieces; said CPU [170] is further configured for identification of significant faults of a process and said faults' cause; said system is further configured to display, on said display device, said comparison to a best performance, said significant process faults, and said faults' cause; and said CPU [170] is further configured for the analysis of the effectiveness of an applied engineering-plan for a machining process, using said predefined engineering score; said system is further configured to display, on said display device, said analysis of the effectiveness of the applied engineering-plan for said machining process.

2. The system [100] according to claim 1, wherein said CPU [170] is further configured to display, on said display device, a realistic goal of one or more of said performances for increasing production capacity, according to the evaluation of said best performances;
such that said system [100] is configured to increase said process's energy efficiency and/or gross profit.

3. The system [100] according to claim 1, wherein said CPU [170] is further configured to display, on said display device, a realistic goal of one or more of said performances for reducing production costs, according to said best performances; such that said system [100] is configured to increase said energy efficiency and/or gross profit.

4. The system [100] according to claim 1, wherein said CPU [170] is further adapted to identify a decline in said performances and classify the source of said decline by comparing said performances with best practice performances over different periods of time and sorting the performances by different said KPIs, and accordingly present maintenance recommendations, on said display device, such that said system [100] is configured for maintaining said energy efficiency and/or said gross profit of said process.

5. The system [100] according to claim 1, wherein said system [100] is further connected to said consumable tools' [120] electrical storage cabinet, for retrieving additional data regarding said consumable tools [120] and further wherein said identification system [140] is configured for the identification of at least one feature selected from a group consisting of:
said workpieces' [110]: identification, material, description, dimensions, cost and application;
said consumable tools' [120]: identification, material, description, dimensions, cost, manufacturer and expected life cycle;
said machines' [130]: identification, operational cost, model and manufacturer; and
any combination thereof.

6. The system [100] according to claim 1, wherein said recording device [150] is configured to record said machines' [130] "working" and "non-working" status and time schedule, according to said machines' [130] measured current consumption from said machines' [130] power supply.

7. The system [100] according to claim 1, wherein said CPU [170] is configured for the calculation and evaluation of said workpieces' [110] performances, extracted from at least one feature selected from a group consisting of:
said unshaped workpieces' [110] cost;
said shaped workpieces' [110] selling prices, according to its resulted quality;
said workpieces' [130] operational cost, for said machining time and idle time;
said consumable tools' [120] relative costs, each dived by the number of their machined workpieces [110] until wear-out;
said workpieces' [110] individual direct operations costs;
said workpieces' [110] individual gross profit; and
any combination thereof; and
at least one feature selected from a group consisting of:
said workpieces' [110] machining time;
said workpieces' [110] idle time;
said workpieces' [110] individual engineering score;
said workpieces' [110] cutting times;
said workpieces' [110] non cutting times;
said workpieces' [110] average spindle power;
said workpieces' [110] number of cuts;
said workpieces' [110] sub operations performances; and
any combination thereof.

8. A industrial-control based method for monitoring and evaluating overall performances of a machining production-line, calculated from each given machined metal workpiece [110], consumable tool [120] and machine [130], comprising the steps:
a. automatically identifying the characteristic features of:
said workpieces [110];
said workpieces' [110] at least one consumable tool [120];
said workpieces' [110] machine [130];
said workpieces' [110] production operations number; and
any combination thereof;
b. recording data concerning said machining production line, selected from a group consisting of:
machining course of action time indicators and velocities of said workpieces [110];
idle time, such as loading or unloading of said workpiece [110];
exceptionally long idle time;
said machines' [130] "fault" time;
said consumable tools' [120] wear time and tool's wear amount; and
any combination thereof;
c. collecting input-data selected from a group consisting of:
said workpieces' [110] machining course of action;
said shaped workpiece's [110] resulted quality;
said machines' [130] "fault" cause;
said exceptional idle time cause;
said consumable tools' [120] wear characteristic features;
said setup time;
said operator ID;
said production batch number; and
any combination thereof;
d. calculating and evaluating the performances of:
said workpieces [110];
said consumable tools [120];
said machines [130];

e. storing:
   all data which is not process-dependent;
   all process-dependent data including: said input data, and all said calculated and evaluated information;
f. selecting a calculation and evaluation method;
g. updating said consumable tools' [120] performances and said machines' [130] performances;
h. selecting displayed elements and combinations;
i. displaying said evaluated performances; and
j. repeating said method for at least two workpieces [110];
wherein said step of calculating and evaluating comprises an iterative and incremental calculation and evaluation of said machining production-line overall performances, by incrementally evaluating said individual workpieces' [110] performances, said consumable tools' [120] performances and said machines' [130] performances, extracted from said input data of a plurality of said workpieces [110] and plurality of said machines [130];
said machining production-line overall performances comprise one or more key performance indicators (KPIs); said KPIs selected from a group consisting of
   i. a gross profit;
   ii. an overall equipment efficiency (OEE);
   iii. direct operations costs; and
   iv. an engineering score defined by $$EngScore = \frac{\left(TabelSpeed\left[\frac{mm}{min}\right] \times CuttingDepth\ [mm]\right)}{ToolWear[mm]};$$

said calculating and evaluating are further configured for comparing said workpieces' [110] performances to a similar workpieces' best performance, extracted from said evaluation of a plurality of said similar workpieces [110]; said calculating and evaluating are further configured for the identification of significant process faults and said faults' cause; said calculating and evaluating are further configured for the analysis of the effectiveness of the applied engineering-plan for the machining process, using said defined engineering score.

9. The method according to claim 8, wherein said step of calculating and evaluating further comprises displaying a realistic goal of one or more of said performances, on said display device, for increasing the production capacity according to the evaluation of said best performances; thereby said method is configured for increasing said process's energy efficiency and/or gross profit.

10. The method according to claim 8, wherein said step of calculating and evaluating further comprises displaying a realistic goal of one or more of said performances, on said display device, for reducing production costs, according to said best performances; thereby said method is configured for increasing said process's energy efficiency and/or gross profit.

11. The method according to claim 8, wherein said step of calculating and evaluating further comprises identifying a decline in said performances and classifying the source of said decline by comparing said performances with best practice performances over different periods of time and sorting the performances by different said KPIs, and accordingly presenting maintenance recommendations, on said display device; thereby said method is configured for maintaining said process's energy efficiency and/or gross profit.

12. The method according to claim 8, wherein said method further comprises a step of retrieving additional data regarding said consumable tools [120], from said consumable tools' [120] electrical storage cabinet.

13. The method according to claim 8, wherein said step of identifying is configured for the identification of features selected from a group consisting of:
   said workpieces' [110]: identification, material, description, dimensions, cost and application;
   said consumable tools' [120]: identification, material, description, dimensions, cost, manufacturer and expected life cycle;
   said machines' [130]-identification, -operational cost, -model and -manufacturer; and
   any combination thereof.

14. The method according to claim 8, wherein said step of calculating and evaluating said workpiece's [110] performances, comprises extracting features selected from a group consisting of:
   said unshaped workpieces' [110] cost;
   said shaped workpieces' [110] selling price, according to its resulted quality;
   said machines' [130] operational cost, for said machining time and idle time;
   said consumable tools' [120] relative costs, each dived by the number of their machined workpieces [110] until wear-out;
   said workpieces' [110] individual direct operations costs;
   said workpieces' [110] individual gross profit; and
   any combination thereof; and
at least one feature selected from a group consisting of:
   said workpieces' [110] machining time;
   said workpieces' [110] idle time;
   said workpieces' [110] individual engineering score;
   said workpieces' [110] cutting times;
   said workpieces' [110] non cutting times;
   said workpieces' [110] average spindle power;
   said workpieces' [110] number of cuts;
   said workpieces' [110] sub operations performances; and
   any combination thereof.

15. The method according to claim 14, wherein said sub operations performances include performance indicators selected from a group consisting of:
   stock removal rate;
   specific stock removal energy;
   chip thickness ratio;
   cutting performance indicators, extracted from the velocities and working parameters of each cutting action of said workpiece [110] and
   any combination thereof.

16. The method according to claim 8, wherein said step of calculating and evaluating said consumable tools' [120] performances, comprises extracting features selected from a group consisting of:
   said consumable tools' [120] cost;
   said consumable tools' [120] wear-out characteristics such as: life-cycle, failure cause;
   said consumable tools' [120] number of machined workpieces [110] until wear-out; and
   any combination thereof.

17. The method according to claim 8, wherein said step of calculating and evaluating performances of said machine [130], comprises extracting features selected from a group consisting of:
   said machines' [130] operational cost;
   said machines' [130] fault time;
   said machines' [130] fault cause;

said machines' [130] working plan;
said machines' [130] exceptional long waiting idle time;
said machines' [130] exceptional long waiting idle time cause;
said machines' [130] setup time;
said machines' [130] neutral time;
said machines' [130] disconnection time; and
any combination thereof.

18. The method according to claim 8, wherein said step of calculating and evaluating comprises collecting a plurality of said individual workpieces' [110] performances and evaluating said machining production-line performances for a predetermined period of time selected from a group consisting of: hour, day, week, month, quarter, year, shift period, operator working period, machine [130] working period, operation period and any combination thereof.

19. The method according to claim 18, wherein said step of calculating and evaluating comprises extracting said best performances, by comparing said plurality of workpieces' [110] performances over said per period of time, using a function selected from a group consisting of: summarize, maximum, minimum, average, percentage and any combination thereof.

20. The method according to claim 8, wherein said step of calculating and evaluating comprises evaluating business plans at least one selected from a group comprising of: choosing said consumable tools' [120] suppliers, choosing said machines' [130] manufacturers, evaluating said applied engineering plans, evaluating workers' efficiency, evaluating machines'[130] efficiency, setting realistic goals to the different departments in the organization, implementing new innovative models with suppliers based on cost per part or improvements sharing, and evaluating the effectiveness of said machining production line, where evaluations are based on said comparison to best machining production-line overall performances further wherein said machine [130] is selected from a group consisting of: metalworking machines, CNC machines, milling machines, turning machines, grinding machines, drilling machines, carving machines, EDM machines, laser machines, forging machines, water jet machines, deburring machines, chamfering machines, broaching machines and any combination thereof, further wherein said consumable tool [120] is a metalworking consumable cutting tool selected from a group consisting of: machining tools, milling tools, turning tools, grinding tools, drilling tools, carving tools, forging dies, deburring tools, chamfering tools, electrodes, broaching tools, dressing tools; and further wherein communications between said identification device [140], wherein said identification device [140] can identify and add an unfamiliar new said item; said recording device [150]; said data-collection device [160], wherein said data collection device [160] can be notified of a planned said exceptional long waiting idle time; said CPU [170]; said storage device [180]; said user interface [190], wherein said user interface [190] is further configured for manual input data; and said display device [195] is selected from a group consisting of wired, wireless and any combination thereof.

21. A modular industrial-control based system [200] for real-time evaluation and monitoring of overall performances of a production-line, calculated from the performances of at least one part [210], at least one consumable material [220] and at least one machine[230]; said system [200] comprising:
a. an identification device [240], configured for performing one or more automated identifications and transmissions of first signals denoting said identifications of at least one item selected from a group consisting of:
said parts [210];
said parts' [210] consumable materials [220];
said parts' [210] machine [230];
said parts' [210] production operations number; and
any combination thereof;
b. a recording device [250], configured to record at least one recorded data, concerning said production-line, selected from a group consisting of:
processing course of action time-indicators, velocities and process parameters of said parts [210];
idle time, such as loading or unloading of said parts [210];
exceptionally long waiting idle time; and
said machines' [230] fault time;
said consumable materials' [220] wear time and wear characteristics; and
any combination thereof;
c. a data-collection device [260], configured to collect at least one input data selected from a group consisting of:
said identifications by said identification device [240];
said recorded data recorded by said recording device [250];
said parts' [210] processing course of action;
said parts' [210] loading idle time;
said produced parts' [210] resulted quality;
said machines' [230] fault cause;
exceptionally long waiting idle time cause;
said consumable materials' [220] wear characteristic features;
setup periods;
operator ID;
production batch number; and
any combination thereof;
d. a Computerized Processing Unit (CPU) [270], configured to receive said input data from said data-collection device [260] and calculate and evaluate, as a function of said input data, at least one performance selected from a group consisting of:
said parts' [210] performances;
said consumable materials' [220] performances;
said machines' [230] performances; and
any combination thereof;
e. a storage device [280], configured to receive from said CPU [270] store at least one entry selected from a group consisting of:
all data which is not process-dependent [285];
all process-dependent data [286] including: said input data, and all said calculated and evaluated performances;
updated said parts' [210] performances;
updated said consumable materials' [220] performances;
updated said machines' [230] performances; and
any combination thereof;
f. a user interface [290], configured for selecting a method of said calculation and and selecting elements and combinations to display said calculated and evaluated performances; and
g. a display device [295], configured to display said calculated and evaluated performances;
wherein said CPU [270] is further configured for an iterative and incremental calculation and evaluation of said production-line overall performances, by incrementally evaluating said individual parts' [210] performances, said consumable materials' [220] performances and said machines' [230] performances, extracted from said input data of a plurality of said parts [210] and plurality of said machines [230]; said system [100] is further configured to display said overall performances on said display device;

said machining production-line overall performances comprise one or more key performance indicators (KPIs); said KPIs selected from a group consisting of
i. a gross profit;
ii. an overall equipment efficiency (OEE);
iii. direct operations costs; and
iv. an engineering score defined by $$EngScore = \frac{\left(TabelSpeed\left[\frac{mm}{min}\right] \times CuttingDepth\ [mm]\right)}{ToolWear[mm]};$$

said CPU [270] is further configured for comparing a said part's [210] performances to a similar part's best performance, extracted from said evaluation of a plurality of said similar parts; said CPU [270] is further configured for identification of significant process faults and said faults' causes; said system is further configured to display, on said display device, said comparison of said part's performances to said best performance, said identification of said significant process faults and said faults' causes; and said CPU [270] is further configured for the analysis of the effectiveness of the applied engineering-plan for the production process, using said defined engineering score; said system is further configured to display, on said display device, said analysis of the effectiveness of the applied engineering-plan for said machining process.

22. The system [200] according to claim 21, wherein said recording device [250] is configured to further record said recorded data selected from a group consisting of:
a. said parts' [210] processing course of action time-indicators, velocities and process parameters;
b. said machines' [230] fault time;
c. said consumable materials' [220] wear time and wear characteristics; and
d. any combination thereof;

wherein said data-collection device [260] is configured to further collect said data input selected from a group consisting of:
e. said part's [210] processing course of action time-indicators, velocities and process parameters;
f. said machine's [230] fault time;
g. said consumable material [220] wear time and wear characteristics; and
h. any combination thereof.

* * * * *